United States Patent
Hoogland

[11] Patent Number: 6,098,528
[45] Date of Patent: Aug. 8, 2000

[54] BLOCK FORMER

[75] Inventor: Valentijn Eise Hoogland, Giekerk, Netherlands

[73] Assignee: Tetra Pak Tebel B.V., Leeuwarden, Netherlands

[21] Appl. No.: 08/889,221

[22] Filed: Jul. 8, 1997

[30] Foreign Application Priority Data

Sep. 7, 1996 [NL] Netherlands ............................. 1003550

[51] Int. Cl.$^7$ .............................. A01J 11/06; A01J 25/00; A01J 25/11; A23C 19/02
[52] U.S. Cl. ................................ 99/454; 99/452; 99/458; 99/459; 99/465
[58] Field of Search ...................... 99/452–460, 464–466, 99/516, 484, 485; 100/37, 137, 127; 425/146, 147, 156, 85, 80.1; 426/36, 582, 486, 495, 289, 478, 512

[56] References Cited

U.S. PATENT DOCUMENTS

| | | | |
|---|---|---|---|
| 2,982,655 | 5/1961 | Budd et al. | 99/456 X |
| 3,449,127 | 6/1969 | Budahn | 426/36 X |
| 3,468,026 | 9/1969 | Robertson et al. | 426/582 X |
| 3,763,769 | 10/1973 | Bysouth et al. | 100/37 |
| 4,061,794 | 12/1977 | Charles | 426/486 |
| 4,137,836 | 2/1979 | Megard | 99/454 |
| 4,157,680 | 6/1979 | Charles | 99/454 |
| 4,237,781 | 12/1980 | Charles . | |
| 4,244,286 | 1/1981 | Rust | 99/459 |
| 4,334,465 | 6/1982 | Brockwell et al. | 99/458 |
| 4,382,969 | 5/1983 | Sadler | 426/512 X |
| 4,539,902 | 9/1985 | Brockwell et al. | 99/454 |
| 4,942,052 | 7/1990 | Posdal | 426/512 |
| 4,960,044 | 10/1990 | Yntema | 99/458 |
| 4,976,980 | 12/1990 | Yntema | 426/495 |
| 5,146,845 | 9/1992 | Pittelko | 99/454 |

FOREIGN PATENT DOCUMENTS

| | | |
|---|---|---|
| 0 367 353 | 5/1990 | European Pat. Off. . |
| 0 368 411 | 5/1990 | European Pat. Off. . |
| 0 620 967 | 10/1994 | European Pat. Off. . |
| 1 293 674 | 4/1962 | France . |
| 36 43 644 | 3/1988 | Germany . |
| 7903152 | 4/1979 | Netherlands . |
| 180374 | 9/1977 | New Zealand . |
| 179014 | 11/1979 | New Zealand . |
| 265118 | 3/1997 | New Zealand . |
| 94/24850 | 11/1994 | WIPO . |

OTHER PUBLICATIONS

Notice of Opposition by Innovative Engineering Limited Filed Dec. 1998 upon New Zealand Patent Application No. 328267.

*Primary Examiner*—Timothy Simone
*Attorney, Agent, or Firm*—Pennie & Edmonds LLP

[57] ABSTRACT

A block former for the production of blocks of cheese, comprising an upright drainage column with a feed opening for curd particles at the upper end, a closed casing and a perforated inner tube. There is an annular space between the casing and the inner tube and a cutting-off device at the lower end for cutting off blocks of cheese. A discharge device is provided for discharging a cut-off block of cheese after a block forming cycle. A vacuum device is also provided for filling under reduced pressure the inner tube with curd particles via the feed opening and for creating a vacuum in the annular space. The column is divided into an upper and a lower part in such a manner that different pressures can prevail simultaneously in the upper and the lower part during any moment of a cycle.

7 Claims, 3 Drawing Sheets

BLOCK FORMER

BACKGROUND OF THE INVENTION

This invention relates to a block former for the production of blocks of cheese, comprising an upright drainage column with a feed opening for curd particles at the upper end, a closed casing and a perforated inner tube, there being an annular space between the casing and the inner tube, and with a cutting-off device at the lower end for cutting off blocks of cheese and a discharge device for discharging a cut-off block of cheese after a block forming cycle, as well as vacuum means for filling under reduced pressure the inner tube with curd particles via the feed opening and creating a vacuum in the annular space, and to a method for the production of blocks of cheese.

Such a block former is known from practice and is described, for instance, in the brochure entitled "Cheddar line" with publication number PB 63003-94 of Tebel-MKT and in the brochure entitled "Block Former" with publication number PB 62993-94 of Tebel-MKT.

Dutch patent application 7903152 also discloses a block former designed as a tower.

The operation of the known block former is as follows. At the upper end of the tower, using vacuum transport air, curd, in the form of cubes, slices, flakes and the like, generally referred to as chips, is fed to the tower. At the bottom end, the column is closed by means of a horizontal guillotine blade or optionally a different suitable closing element. When the tower is full, the feed opening is closed off by means of a valve or the like and a vacuum is created in the tower. The curd is consolidated in the tower and also drained under the influence of vacuum and static pressure.

At set times the tower is opened at the bottom, in that the guillotine blade is moved aside. Also, in a chamber under the tower, the so-called pre-pressing chamber, a vacuum is then created and the tower itself is aerated. As a consequence of the differential pressure thus obtained and, of course, as a consequence of the weight of the pillar of curd, the pillar of curd descends while being supported and guided at the underside by a hydraulically or pneumatically driven supporting platform. To promote the release of the pillar of curd, the inner tube flares slightly in downward direction. As soon as the pillar of curd has descended over a determined distance, the lower portion of the pillar of curd is severed with the aid of the guillotine blade and the underside of the tower is closed off again. Then the severed block is pre-pressed between the supporting platform and the blade, while concurrently new curd chips are fed to the top of the tower. After pre-pressing, the block of cheese obtained is discharged from the pre-pressing chamber to be packaged and processed further.

One of the problems in increasing the capacity of such a block former is that in the case of a shorter cycle time, which accompanies a greater capacity, there is insufficient time available to feed sufficient curd to the tower.

SUMMARY OF THE INVENTION

The object of the invention is to solve the problem outlined and generally to make available a simple method and block former, respectively, with an increased production capacity. To that end, according to the invention, a block former of the above-described type is characterized in that the column is divided into an upper and a lower part by separating means, in such a manner that different pressures can prevail simultaneously in the upper and the lower part during any moment of a cycle.

A method of the above-described type is characterized according to the invention in that after the cut-off of a block of cheese at the lower end and the re-closure of the column at the lower end, in the upper part of the column curd particles are sucked in to fill the inner tube, while simultaneously a higher vacuum is created in the lower part of the column, and that after the filling phase the upper part and the lower part of the column are brought into communication with each other so that in the upper part also a higher vacuum is created.

BRIEF DESCRIPTION OF THE DRAWINGS

Hereinafter the invention will be further described with reference to the accompanying drawings of an exemplary embodiment.

DETAILED DESCRIPTION OF THE INVENTION

Figure 1:
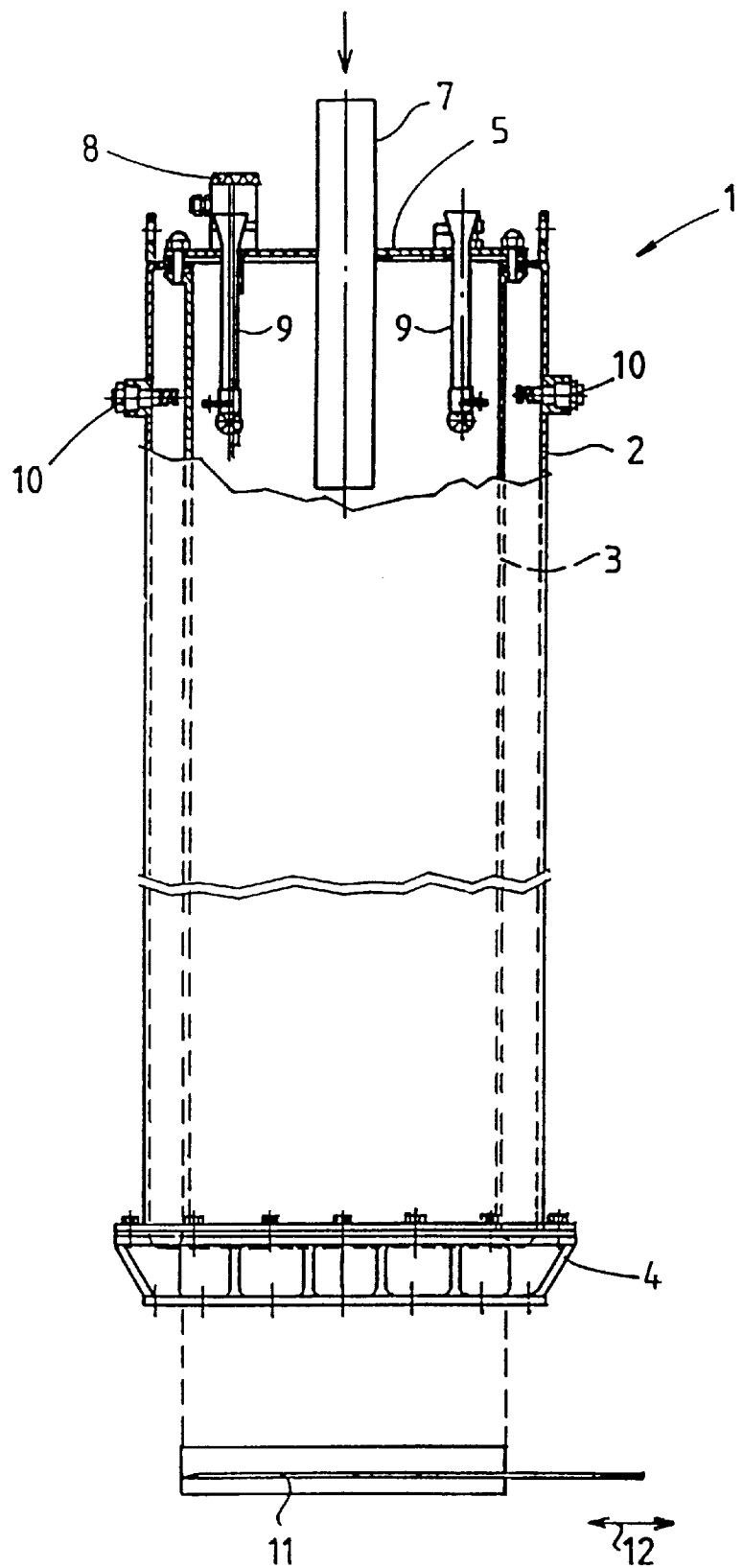
FIG. 1 diagrammatically shows an elevation, partly cutaway, of a known block former.

FIG. 1 diagrammatically shows an elevation with cutaway parts of a known block former 1. Such a block former is used, for instance, in the production of cheese of the Cheddar type. The block former shown has a shape of a tower and comprises an outer casing 2, a perforated inner tube 3, a foot portion 4 and an upper cover 5. Between the casing and the inner tube is an annular free space 6. Through the lid reaches a curd feed pipe 7, provided with a valve. Via pipe 7, with the valve open, and with the aid of a partial vacuum created in the tower, curd chips can be fed to the space within the inner tube. A prove 8 serves to detect and monitor the curd level in the tower. Further, sprayers 9 and 10 of a cleaning system are shown. Arranged under the tower is a guillotine blade 11 which can move back and forth in the direction of an arrow 12 to periodically release the pillar of curd resting on the blade, so that it can descend, and subsequently, at the end of a block forming cycle, to cut if off for forming a block of cheese. When the blade closes off the tower at the lower end, a (pulsating) vacuum is created in the tower to consolidate and drain the curd. When the blade is moved aside so that the pillar of curd can descend, a vacuum prevails in the pre-pressing chamber, not shown, under the blade, but then in the tower itself the atmospheric pressure prevails, so that the pillar of curd is pressed down by the differential pressure and cannot stick in the inner tube. However, as long as the atmospheric pressure prevails in the tower, no new curd chips can be supplied because that requires a vacuum to be created in the tower. Therefore, in the known block former the supply of new cud chips cannot be started until the guillotine blade is in the closed position again. Further, during the filling phase, drainage and compaction occur to a slight extent only, because in that phase only a slight degree of reduced pressure can be realized in the tower, since during the filling phase the valve in the feed pipe 7 is open. The known block formers have columns of a height of 5 to 7 meters. The processing capacity could be increased by extending the towers. This is due to the fact that the curd pillar's own weight is thereby increased, so that a greater compaction and drainage are obtained. This enables shorter cycle times. In this connection, the cycle time is the time elapsing between the cut-off of two successive block of cheese. A restraining factor in the shortening of the cycle time, however, is the necessity of still having to supply new curd chips after the closure of the guillotine blade. Another restraining factor can be the necessity of pre-pressing the cut-off blocks of cheese after the closure of the blade, against the underside of the blade to obtain an acceptable and well preformed block of cheese.

Figure 2:
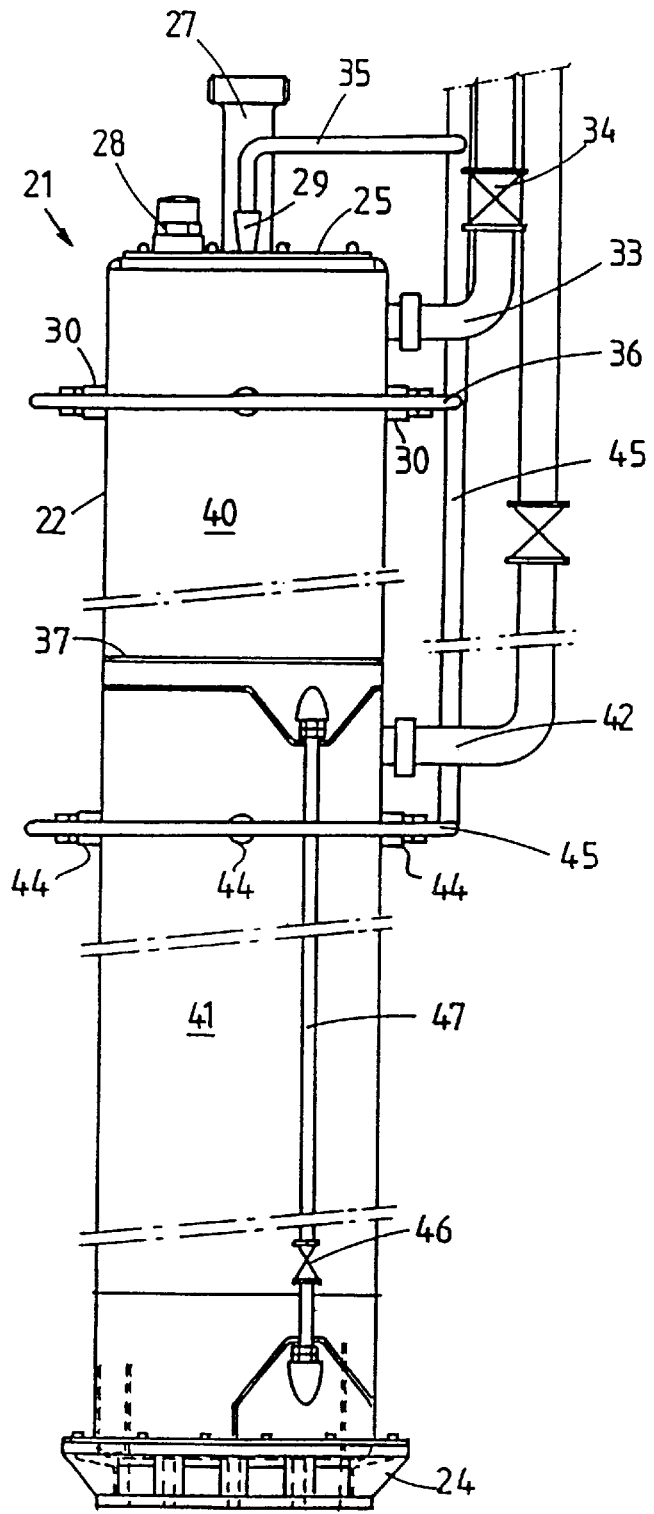
FIG. 2 diagrammatically shows an elevation of an example of a block former according to the invention provided with various pipe lines.
Figure 3:
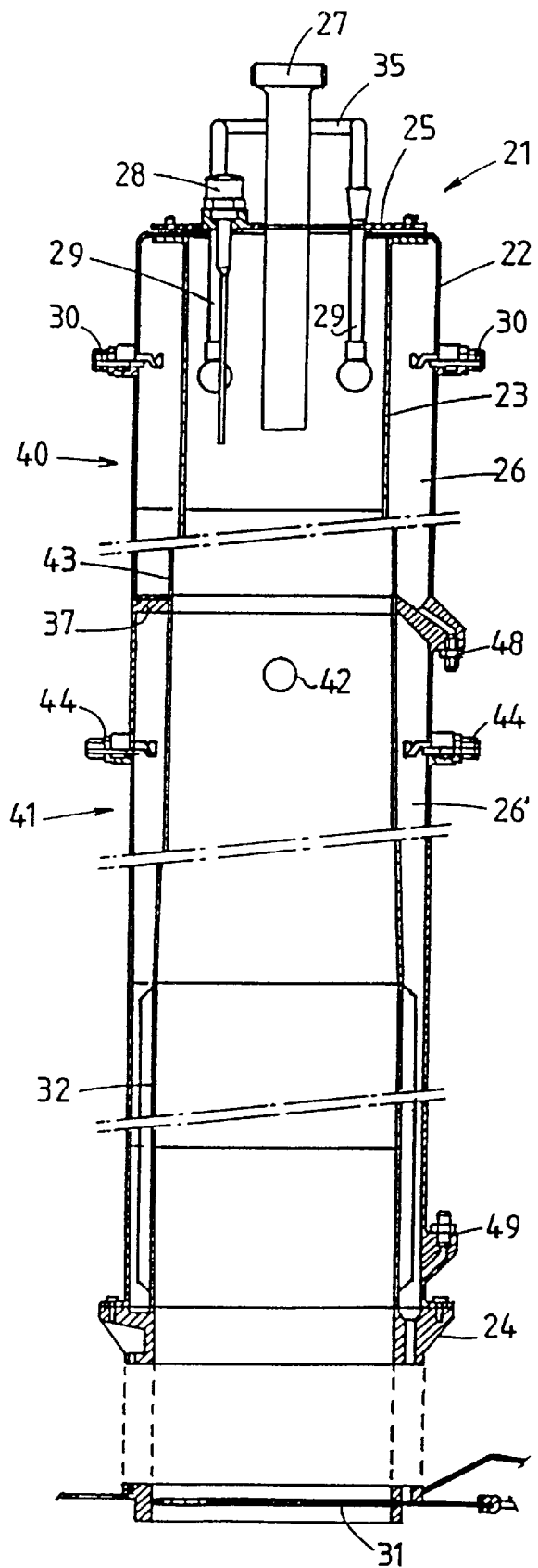
FIG. 3 diagrammatically shows in cross section a similar block former to that shown in FIG. 2.

FIGS. 2 and 3 diagrammatically show an example of the block former according to the invention. The block former 21 shown, again has a tower with an outer casing 22, a perforated inner tube 23, a foot portion 24, an upper cover 25, a free annular space 26, 26' between the outer casing and the inner tube, a curd feed pipe 27, a level prove 28, cleaning sprayers 29, 30 and a guillotine blade 31. The perforated inner tube has a shape slightly tapering outwards in downward direction, with the exception of a lower section 32, as will be further explained in the following.

In FIG. 2 at 33 the vacuum connection is designated which, through creating a reduced pressure in the upper part of the tower, provides for the supply of curd chips via the curd feed pipe 27 provided with a valve, now shown. The vacuum connection 33 is provided with a valve 34. Further, at 35 and 36 pipes are shown for the supply of cleaning liquid to the sprayers 29 and 30.

The tower according to the invention is divided in two parts by means of a cross flange 37 provided in the annular space 26 between the inner tube and the outer casing. If the tower is filled with curd, the cross flange together with the pillar of curd constitutes an effective separation between the upper part 40 of the tower and the lower part 41 of the tower. The lower part is provided with a separate vacuum pipe 42, so that a vacuum can be created in the lower part and in the upper part of the tower separately. In this manner, for instance, a high (pulsating) vacuum can already be created in the lower part while in the upper part of the tower curd chips are being supplied via the pipe 27. On the other hand, if desired, during the descent of the pillar of curd an atmospheric pressure can prevail in the lower part of the tower, while in the upper part of the tower a reduced pressure is already being created again for the purpose of feeding new curd chips.

In general, the separation between the upper part and the lower part of the tower makes it possible to have different pressures prevail simultaneously in the respective tower parts, at any moment of the block forming cycle. As a consequence, the supply of curd chips at the top of the tower can take place independently of the discharge of blocks of cheese at the bottom of the tower, or, in general, independently of the block forming cycle.

The separation between the two parts of the tower can be enhanced by leaving, adjacent to the cross flange 37, a section 43 of the inner tube unperforated over a certain height. The unperforated section is preferably located on opposite sides of the cross flange. This prevents air streams between the two parts of the tower via the curd.

Further, the lower part 41 of the tower is provided with separate cleaning sprayers 44 with associated feed pipes 45.

Furthermore, between the annular space 26 in the upper part of the tower and the annular space 26' in the lower part of the tower, a connecting pipe 47 provided with a valve 46 is arranged. This connecting pipe serves, with the valve 46 open, on the one hand to discharge whey from the upper part of the tower to the lower part during normal operation and on the other hand to effect an equalization of pressure between the two parts of the tower. FIG. 3 shows only the connection points 48, 49 of the connecting pipe. It can be seen that these points, owing to their respective location lower than the flange 37 and higher than the bottom end of the annular space 26', enable a good through-flow of the whey.

The use of a separation between an upper and a lower part of the tower enables a greater production capacity, since the supply of curd chips to the tower can now take place at any desired moment during the block forming cycle without necessitating an interruption of the block forming cycle. As a result, the blocks of cheese can be discharged faster at the lower end of the tower and the cycle time can be shorter. However, if the residence time of the curd in the tower is too short, this gives rise to an insufficiently compact block of cheese. By the use of a longer tower, the residence time can be extended, while yet maintaining the shorter cycle time enabled by the separation between the upper and the lower part of the tower.

Experiments have shown that with higher towers the accuracy of the weight of the blocks produced increases, while the quality of the blocks remains the same or is better. It was found that pre-pressing of the blocks of cheese could be omitted, in particular if the lower part of the tower 32 is of straight rather than flaring design. In that case, presumably, owing to the higher pressure prevailing in a longer tower, pre-pressing, as it were, already occurs in the lower part of the tower to an extent sufficient to obtain a block of good quality and dimensional stability, also without pre-pressing in the pre-pressing chamber.

Not only can a block former according to the invention therefore be operated with a greater production capacity, it can also render pre-pressing during regular production superfluous. This does not hold for the initial phase and the final phase of a production period of a tower.

A block former according to the invention can be controlled as follows.

Starting from a filled tower already in operation, at a certain time the guillotine blade is opened and in the pre-pressing chamber a vacuum is created. Simultaneously, the tower is aerated, for instance via the switch valve 34 and the valve 46 in the connecting pipe 47. The pillar of curd then descends as a result of the differential pressure and its own weight over a predetermined distance, whereupon the blade closes again. The valve 46 remains closed and via the vacuum pipe 42 a high, preferably pulsating vacuum is produced in the lower part of the tower. Simultaneously, in the upper part of the tower, with the valve in the feed pipe 27 open, curd particles are drawn in and in the chamber under the closed blade the block of cheese obtained is discharged without pre-pressing. After the level sensor 28 indicates that the tower is sufficiently filled again, the feed pipe is closed and a high vacuum is also created in the upper part of the tower. Also, the valve 46 is opened, so that in both parts of the tower the same pressure prevails and the whey can be discharged from both parts of the tower. After some time the guillotine blade opens again and the cycle repeats itself.

It is also possible for curd particles to be supplied already during the descent of the pillar of curd, since in that case also a differential pressure prevails across the pillar of curd, so that sticking can be prevented. It is even conceivable that curd chips are supplied continuously, uninterruptedly or substantially uninterruptedly at the upper end of the tower, while in the lower part of the tower the block forming cycles progress in the usual manner. The upper part of the tower then remains separated from the lower part at all times and should have separate whey discharge means.

Further, it is possible, during the downward movement of the pillar of curd, to temporarily create an excess pressure, that is, a higher pressure than the atmospheric pressure, in the upper part of the tower, if necessary with an interruption of the supply of curd particles.

It is noted that after the foregoing, various modifications will readily occur to those skilled in the art. Thus, the separation between the two tower parts can also be accomplished with, for instance, a guillotine blade or a different type of mechanical separation element. It is also possible to combine a number of towers into a single production unit, using a joint control system for the vacuum valves, the supply valves, the guillotine blades and the discharge system for the blocks of cheese formed.

These and similar modifications are within reach of those skilled in the art.

What is claimed is:

1. A block former for the production of blocks of cheese, comprising an upright drainage column with a feed opening for curd particles at the upper end, a closed casing and a perforated inner tube, there being an annular space between the casing and the inner tube, and with a cutting-off device at the lower end for cutting off blocks of cheese and a discharge device for discharging a cut-off block of cheese after a block forming cycle, as well as vacuum means for filling under reduced pressure the inner tube with curd particles via the feed opening and creating a vacuum in the annular space, wherein the column is divided into an upper and a lower part by separating means, in such a manner that different pressures can prevail simultaneously in the upper and lower part during any moment of cycle.

2. A block former according to claim 1, wherein the separating means comprises a closed cross flange arranged between the casing and the inner tube.

3. A block former according to claim 2, wherein the separating means further comprises an imperforate inner tube section contiguous to the cross flange.

4. A block former according to claim 3, wherein the imperforate section extends on opposite side of the cross flange.

5. A block former according to claim 1, wherein the separating means comprises a guillotine blade movable transversely to the tower.

6. A block former according to claim 1, wherein the annular space of the upper part of the column communicates with the annular space of the lower part of the column at least via one operable valve.

7. A block former according to claim 1, wherein the inner tube gradually widens to a slight extent from the top towards the bottom, as far as a lower section which has a constant cross section over the residual length of the inner tube, which cross section corresponds with the shape of the block of cheese to be formed.

* * * * *

UNITED STATES PATENT AND TRADEMARK OFFICE
CERTIFICATE OF CORRECTION

PATENT NO. : 6,098,528
DATED : August 8, 2000
INVENTOR(S) : Valentijn Eise Hoogland It is certified that error appears in the above-identified patent and that said Letters Patent is hereby corrected as shown below:

Column 6,
Line 12, change "side" to -- sides --.

Signed and Sealed this

Seventh Day of August, 2001

Attest:

NICHOLAS P. GODICI
Attesting Officer    Acting Director of the United States Patent and Trademark Office